United States Patent [19]

Mayer et al.

[11] Patent Number: 5,602,485
[45] Date of Patent: Feb. 11, 1997

[54] APPARATUS FOR SCREENING CAPSULES USING VELOCITY MEASUREMENTS

[75] Inventors: William N. Mayer, White Bear Lake; Daniel W. Mayer, St. Paul, both of Minn.; Roger C. Oestreich, River Falls, Wis.

[73] Assignee: Modern Controls, Inc., Minneapolis, Minn.

[21] Appl. No.: 585,778

[22] Filed: Jan. 16, 1996

[51] Int. Cl.⁶ .............................. G01R 27/26; B07C 5/28
[52] U.S. Cl. ........................ 324/663; 324/686; 324/672; 209/571; 209/592; 177/210 C
[58] Field of Search ............................ 324/658, 663–665, 324/671, 672, 679, 686, 689, 690; 209/539, 571, 592, 625; 177/210 C, 50; 364/555

[56] References Cited

U.S. PATENT DOCUMENTS

| | | | |
|---|---|---|---|
| 3,900,718 | 8/1975 | Seward | 364/555 |
| 4,223,751 | 9/1980 | Ayers et al. | 209/571 X |
| 4,402,412 | 9/1983 | Wood | 209/625 |
| 4,569,445 | 2/1986 | Kovats et al. | 209/571 X |
| 4,965,523 | 10/1990 | Baker et al. | 324/671 X |
| 5,135,113 | 8/1992 | Mayer et al. | 324/663 X |
| 5,337,902 | 8/1994 | Evans et al. | 209/571 X |

*Primary Examiner*—Maura K. Regan
*Assistant Examiner*—Diep Do
*Attorney, Agent, or Firm*—Palmatier, Sjoquist, Helget & Voigt, P.A.

[57] ABSTRACT

A device for checking the weights of individual capsules in a stream of capsules by passing the stream of capsules past a capacitance sensor which measures the capacitance of each capsule as representative of the capsule weight, and passing the stream of capsules past a velocity sensor which measures the velocity of each capsule as representative of the capsule weight. The measured capacitance and measured velocity values are each compared against preset ranges of values, and a capsule is mechanically deflected from the moving stream if the comparison shows either measured value to be outside the respective preset range of values.

8 Claims, 4 Drawing Sheets

APPARATUS FOR SCREENING CAPSULES USING VELOCITY MEASUREMENTS

BACKGROUND OF THE INVENTION

The present invention relates to an apparatus for screening capsules during the manufacturing and filling process wherein the capsules are screened and classified at a relatively high production rate. The invention relates to U.S. Pat. No. 4,223,751, issued Sep. 23, 1980, and entitled "High-Speed Capacitance Apparatus for Classifying Pharmaceutical Capsules." The present invention comprises an enhancement and improvement to the machine disclosed in the aforementioned patent which enables a higher degree of accuracy in the operation of the aforementioned machine.

The machine described in the aforementioned patent includes a hopper for holding a supply a capsules of a type and size commonly used in the pharmaceutical industry. The capsules in the hopper are conveyed to a turntable device which has a chute tangentially positioned along its circumference. Capsules are fed into the chute in a continuous stream, and the chute conveys the capsules into an air jet mechanism which propels them through a capacitive sensing device. The capacitance sensing device detects variations in weight of the capsules by virtue of their respective capacitance measurements as the capsules are propelled through the sensing device. A mechanical deflector may be energized to deflect capsules which fall outside of predetermined weight tolerances into a different trajectory than the trajectory of the "good" capsules. The respective trajectories lead to collection receptacles wherein the "good" and "bad" capsules may be separately collected. The machine is designed to operate at fairly high rates of speed and is capable of processing and weighing capsules at rates in excess of 2,500 capsules per minute.

While the aforementioned machine is capable of operating at the stated processing speed, there are some problems presented by particular capsules or batches of capsules which can lead to systemic errors in operating the machine. The basic technology utilized by the machine in providing its weight measurements and thereby classifying capsules by weight is a capacitance sensor technology. This technology takes advantage of the fact that the capacitance measurement of a capsule varies linearly with the mass of the capsule; and therefore, capacitance measurements made of a stream of capsules propelled through the sensor provide a stream of weight measurements corresponding to the capsule's weight. The technology assumes that the capsules are of the same size and shape and have a uniform dielectric constant; and under these assumptions, the apparatus functions very well.

Non-uniformity of the dielectrics in a batch of capsules can occur as a result of general environmental effects and also as a result of random differences in the dielectric constant of the capsule material. The environmental changes are first order effects in particular caused by relative humidity or water vapor; the variation in dielectric constant caused by material change is controllable during earlier stages of the manufacturing process and is, therefore, relatively rare.

The general environmental effects on a capsule are quite understandable when an analysis of the material and function of the capsule is understood. The outer shell of a capsule is made of a solid state gelatin material which is supposed to dissolve or melt in the body and, therefore, is very hygroscopic. The gelatin material is designed to start swelling and dissolving at approximately 60%–70% relative humidity (RH).

Previous research conducted by the assignee of the present invention has compared capsules which have been weighed gravimetrically and also have been weighed utilizing the capacitance measuring techniques at different RH equilibriums. These research results show that the capacitance measurement of a capsule generally increases linearly as the RH increases from 20%–60% RH. The perceived weight predicted by the capacitance measurement increases about 30% over this range of RH variation. As the capsule RH is increased above about 60%, the perceived weight measurement rather drastically increases, probably caused as much by the fact that the capsule is beginning to dissolve as any other factor. This research shows that the aforementioned apparatus should not be used as a capsule screening and weighing machine when the capsule and/or ambient RH is greater than about 60%. When the capsule and/or ambient RH is below about 60%, a simple calibration procedure can be used to correct the capacitance-based measurement to correspond to the actual gravimetric measurement. Since the capsules are typically stored under ambient conditions, the correction can be made simply by measuring the ambient RH in the vicinity of the machine during operating periods. In typical operation, this problem is adequately resolved if the calibration procedure is performed approximately once a day while the machine is being used.

The affects of random differences in dielectric constant are seldom noticed in capsules manufactured as a part of a single batch; the change most often occurs when comparing capsules made in different batches. Occasionally a capsule batch will contain some capsules that have a different dielectric constant, and this is usually caused by storage conditions or presorting conditions wherein different drums of capsules may be combined and mixed together, or where a partial drum of capsules produced in one batch is refilled from a drum of capsules made from a second batch. While such effects are relatively rare, it is now possible to take these effects into account by reason of the present invention.

Another cause of moisture variations between capsules in the same batch can arise if the user stores the capsules in a drum containing a small water adsorbing bag. In this case, the capsules closest to the bag will contain less water than other capsules in the drum and will therefore have a lower dielectric coefficient than the other capsules, thereby causing a lower reading of capacitance, and leading to an apparent reduction in weight when measured by the machine utilizing capacitance measurements for weight determination.

While it has been observed that all capsules which are propelled through the capacitance measuring device are propelled with the same initial force, the heavier capsules will reach a lower average velocity and the lighter capsules will reach a higher average velocity. Since the velocity of a capsule can be calculated by measuring the time the capsule requires to pass between two known points, the mass (weight) of the capsule can be readily calculated based upon these time measurements. The present invention, therefore, utilizes time measurements to provide a measure of velocity and, therefore, a measure of weight which is used as an enhancement and improvement over the apparatus described in the aforementioned prior art patent. The velocity measurement is used as a supplementary measurement, in addition to the capacitance measurement, in order to have two checks of the capsule weight to improve overall reliability of the machine to reject all capsules which may be heavier or lighter than the published specification for capsule weights. Because each technique has some accuracy range, the use of the two techniques together ensures that capsules will be rejected if either measurement test fails even though one or the other test may actually present a false rejection measurement because of its own accuracy limitations. According to industry standards it is better to reject an occasional capsule on the basis of an inaccurate measurement than to accept an occasional capsule which is outside permissible weight specifications.

SUMMARY OF THE INVENTION

The present invention comprises an apparatus for measurement of capsule weights for a stream of capsules which are passed through the machine in an end-to-end controlled velocity configuration. The capsule stream is propelled by air jets through a set of capacitor plates, and an electrical signal is developed by each capsule as it passes through the capacitor sensor. The amplitude of the electrical signal is measured to provide a measure of weight utilizing capacitance measurement principles, and the width of the electrical signal is measured to provide a measure of weight utilizing velocity measurement principles. An acceptable range of amplitudes is predetermined to define the acceptable range of capsule weights, and an acceptable range of pulse widths is predetermined to define the acceptable range of capsule weights. If a capsule measurement falls outside either of these ranges the capsule is rejected as being either too heavy or too light for specifications. The rejection mechanism comprises a mechanical flipper arm which can deflect into the flight path of a capsule as it leaves the sensor to thereby deflect the capsule flight path toward a reject collection bin.

It is a principal object and advantage of the present invention to use both a capacitance measurement and a velocity measurement to detect the weight of capsules and to reject capsules falling outside a predetermined weight range.

It is another object and advantage of the present invention to detect capsule weight for each capsule in a stream of capsules which are propelled past a measurement station.

It is yet another object and advantage of the present invention to provide a weight checking feature for capsules in a moving stream of capsules at a rate of approximately 2,500 capsules per minute.

It is a further object and advantage of the present invention to provide capsule weight measurements for streams of capsules wherein the weight measurements may be collected as data and statistical calculations may be made of the data to develop statistically accurate historical records of capsule weight measurement data.

Other objects and advantages of the invention will become apparent from the following specification and claims and with reference to the appended drawings.

DESCRIPTION OF THE PREFERRED EMBODIMENT

Figure 1:
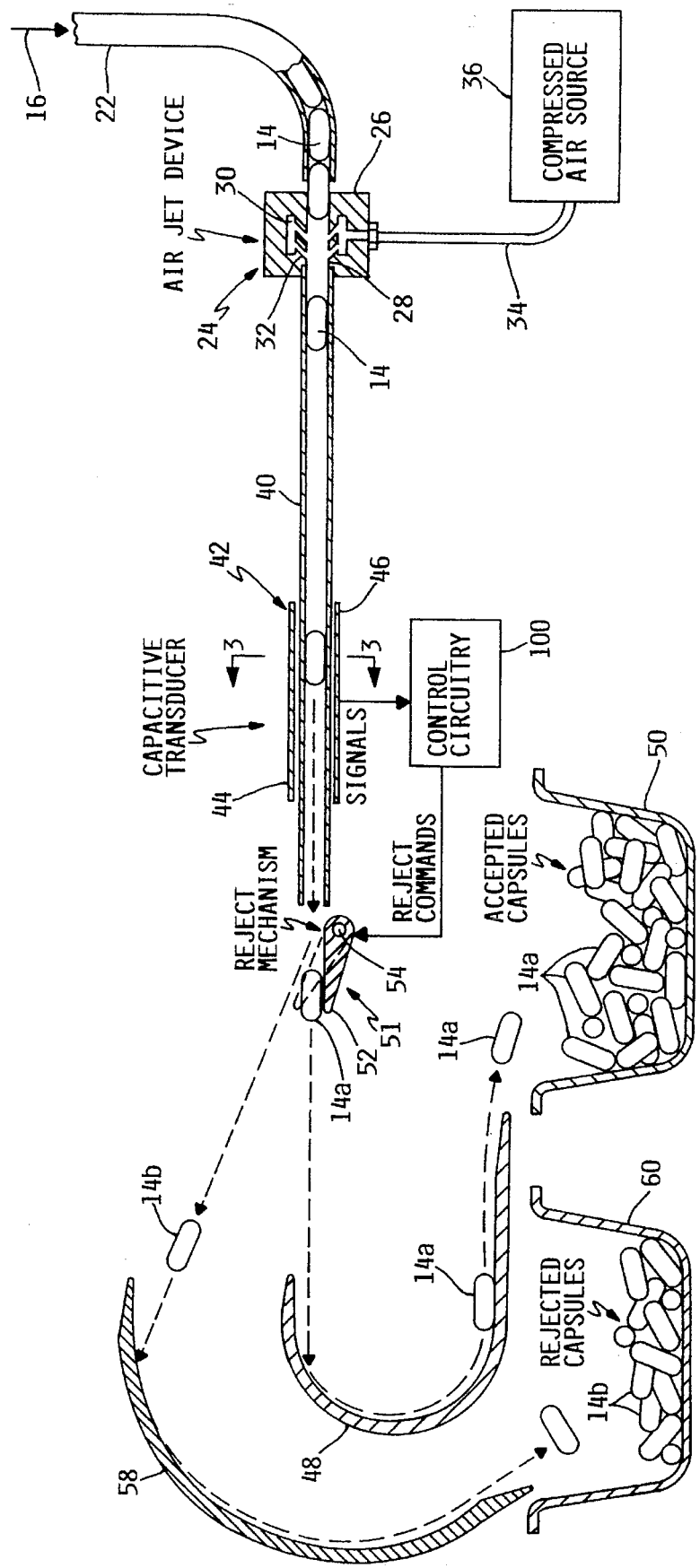
FIG. 1 shows a diagram of the machine for measuring capsule weights.

Referring first to FIG. 1, a diagram of the apparatus incorporating the present invention is shown in pictorial form. An inlet chute 22 receives capsules 14 from a hopper or conveyor, the capsules traveling in the direction shown by arrow 16. The capsules 14 drop downwardly through chute 22 into an air jet device 24. Air jet device 24 comprises a housing 26 having a central passage 28 aligned with the end of chute 22 and having a plurality of inclined air jet passages 32 connected between central passage 28 and a manifold 30. Manifold 30 is connected via an air line 34 to a source of compressed air 36.

The outlet of central passage 28 is connected to a dielectric tube 40, preferably made from plastic or glass. Dielectric tube 40 passes between a pair of spaced-apart capacitor plates 42, 46 and terminates in an open outlet end proximate a reject mechanism 51. Reject mechanism 51 comprises a flipper arm 52 which is mounted on an oscillatory shaft 54. Shaft 54 is connected to a drive motor 56 (see FIG. 4) which may be a stepper or torque motor. The activation on motor 56 is controlled by a reject signal from control circuitry 100.

FIG. 1 shows a series of capsules 14a having a substantially horizontal path of travel to curved deflector 48 and thereafter a curved path of travel to container 50; these capsules are illustrated to show the path of travel when flipper arm 52 is not activated. FIG. 1 also shows a series of capsules 14b having a path of travel inclined upwardly to curved deflector 58 and thereafter a curved path of travel to container 60; these capsules are illustrated to show the path of travel when the flipper arm is activated to deflect the capsules upwardly.

Figure 2:
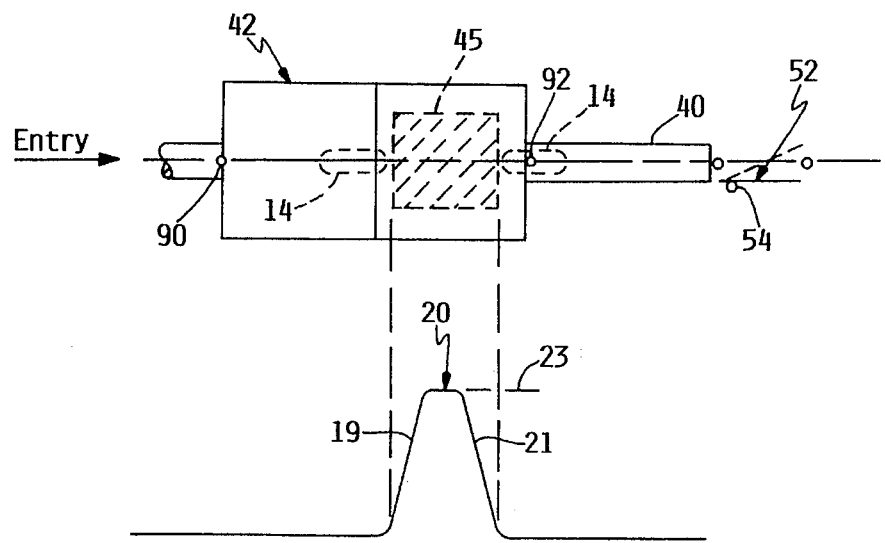
FIG. 2 shows the electrical waveform developed as a capsule passes through a sensor.

FIG. 2 shows a diagram of the sensor and the electrical waveform 20 developed as a capsule 14 passes through the sensor in the direction shown by the arrows. The crosshatched area 45 illustrates the area of the capacitor plates 44, 46, and the lower waveform 20 shows the electrical waveform as the capsule passes between the plates 44, 46. It is apparent that the electrical waveform 20 has a steep rising edge 19 as the capsule enters the region between plates 44, 46 and a steep falling edge 21 as the capsule leaves the region between plates 44, 46. The amplitude 23 of the waveform 20 is indicative of the capsule weight.

Figure 3:
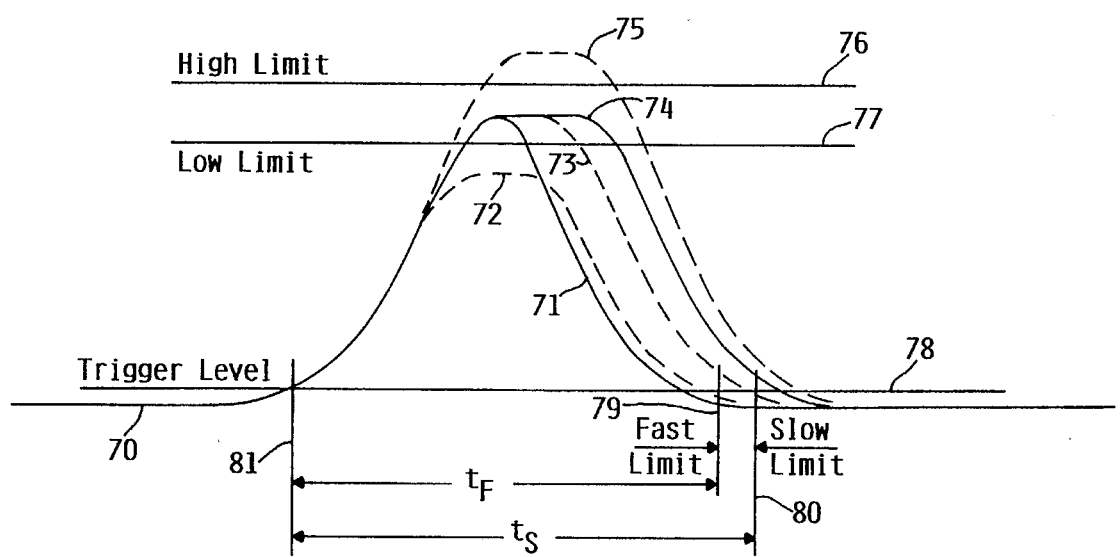
FIG. 3 shows the electrical waveforms of capsules under several different conditions of measurement.

FIG. 3 shows the electrical waveforms of capsules under several different conditions of measurement. In all cases, the initial waveform voltage level 70 is representative of a "zero" level; i.e., no signal is present. As each capsule passes through the sensor an increasing voltage pulse is detected, which voltage pulse reaches an amplitude representative of the apparent weight of the capsule, and the waveform then drops back to the "zero" level as the capsule completely passes through the sensor. A predetermined trigger voltage level 78 is selected to serve as a time base for measuring the time the capsule requires to pass through the sensor; i.e., the time measured from the waveform first crossing the trigger level 78 until the waveform next crosses the trigger level 78 as it decays toward the "zero" level 70. A predetermined range of acceptable times is selected, the range being empirically determined as indicative of the maximum and minimum velocities of the capsules, considering the acceptable range of capsule weights which the system will pass. In FIG. 3, the predetermined range of acceptable times is indicated as the region between line 79 and line 80. A predetermined range of acceptable amplitudes is also selected to represent the range of apparent weights which the system will pass. In FIG. 3, this amplitude range is shown as the region between lines 76 and 77. Therefore, each capsule which passes through the sensor is subjected to an apparent weight (amplitude) measurement and a velocity (time) measurement, and both of these measurements are compared to the predetermined acceptable range of measurements for the respective parameter.

The several waveforms shown on FIG. 3 are indicative of various capsule parameters which typical capsules might exhibit. For example, waveform 73 (dashed line) represents an acceptable capsule having a weight falling within the acceptable ranges. The amplitude of waveform 73 is between lines 76 and 77, and the waveform time, measured from the first waveform crossing point with trigger level 78 to the second waveform crossing point with trigger level 78, falls between lines 79 and 80.

Waveform 72 (dashed line) shows a capsule having an apparent weight which is unacceptably light, because the amplitude of the waveform falls below line 77. The timing of this capsule is also low, because the second crossing point of trigger level 78 occurs before line 79, indicating that the capsule velocity was too high. Both of these measured parameters are indicative of a lightweight capsule which is outside the acceptable weight range selected for capsules of this type.

Waveform 71 (solid line) shows a capsule having an apparent weight within the acceptable amplitude range, but a velocity which is much higher than the acceptable range, because the second crossing point of trigger level 78 occurs much earlier than the acceptable range. These measurements indicate a lightweight capsule having a high dielectric coefficient, which might be about 5% higher than the normal dielectric coefficient for capsules of this type.

Waveform 74 (solid line) shows a capsule having an apparent weight within the acceptable amplitude range, but a velocity which is lower than the acceptable range, because the second crossing point of trigger level 78 occurs later than the acceptable range. These measurements indicate a heavyweight capsule having a low dielectric coefficient, which might be about 5% lower than the normal dielectric coefficient for capsules of this type.

Waveform 75 (dashed line) shows a capsule having an apparent weight outside the acceptable amplitude range, and a velocity which is also outside the acceptable range, because the second crossing point of trigger level 78 occurs later than the acceptable range. These measurements indicate a heavyweight capsule having a normal dielectric coefficient for capsules of this type or perhaps also having a low dielectric coefficient.

Figure 4A:
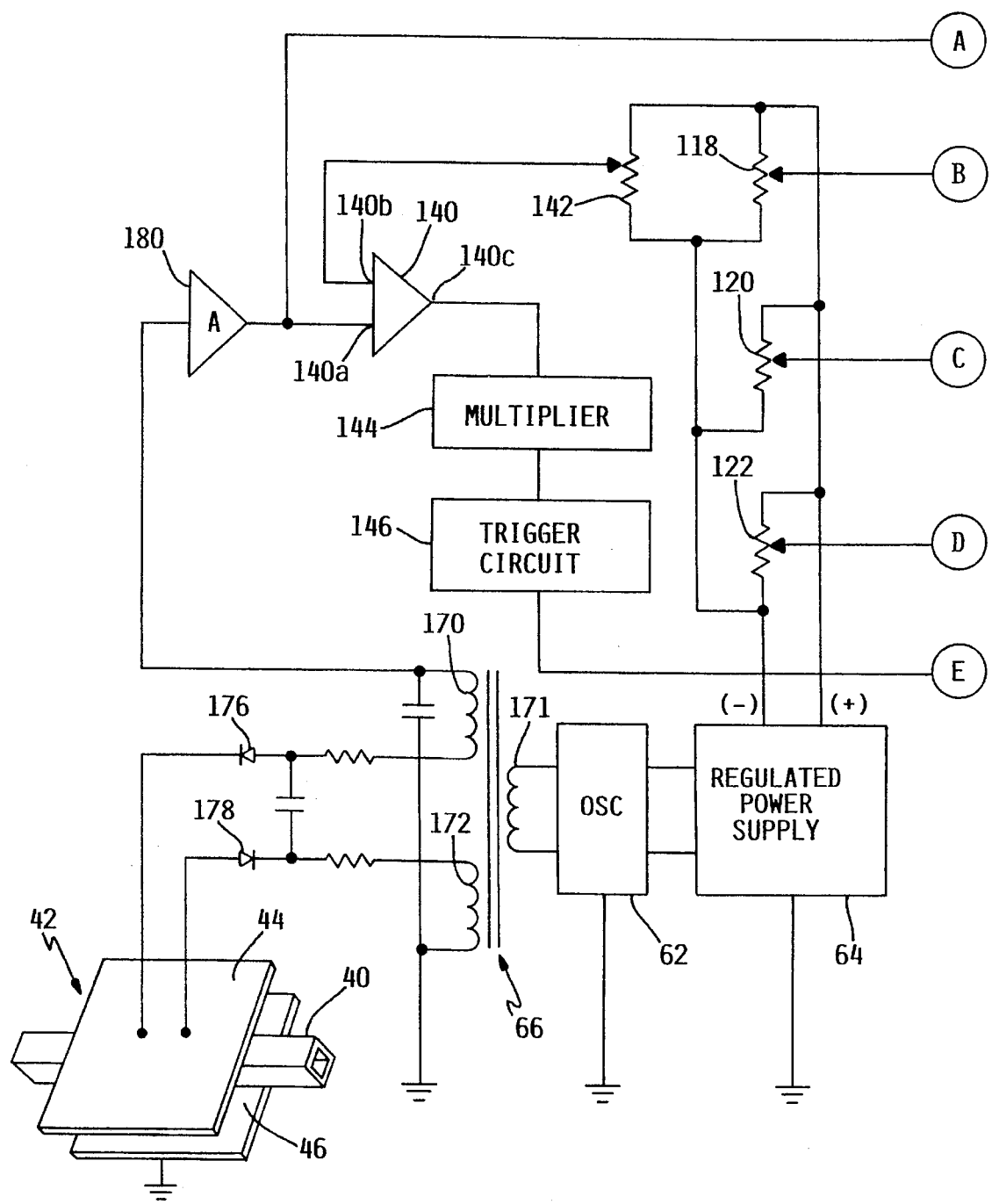
FIG. 4 shows a circuit diagram of the signal processing circuits of the invention.
Figure 4B:
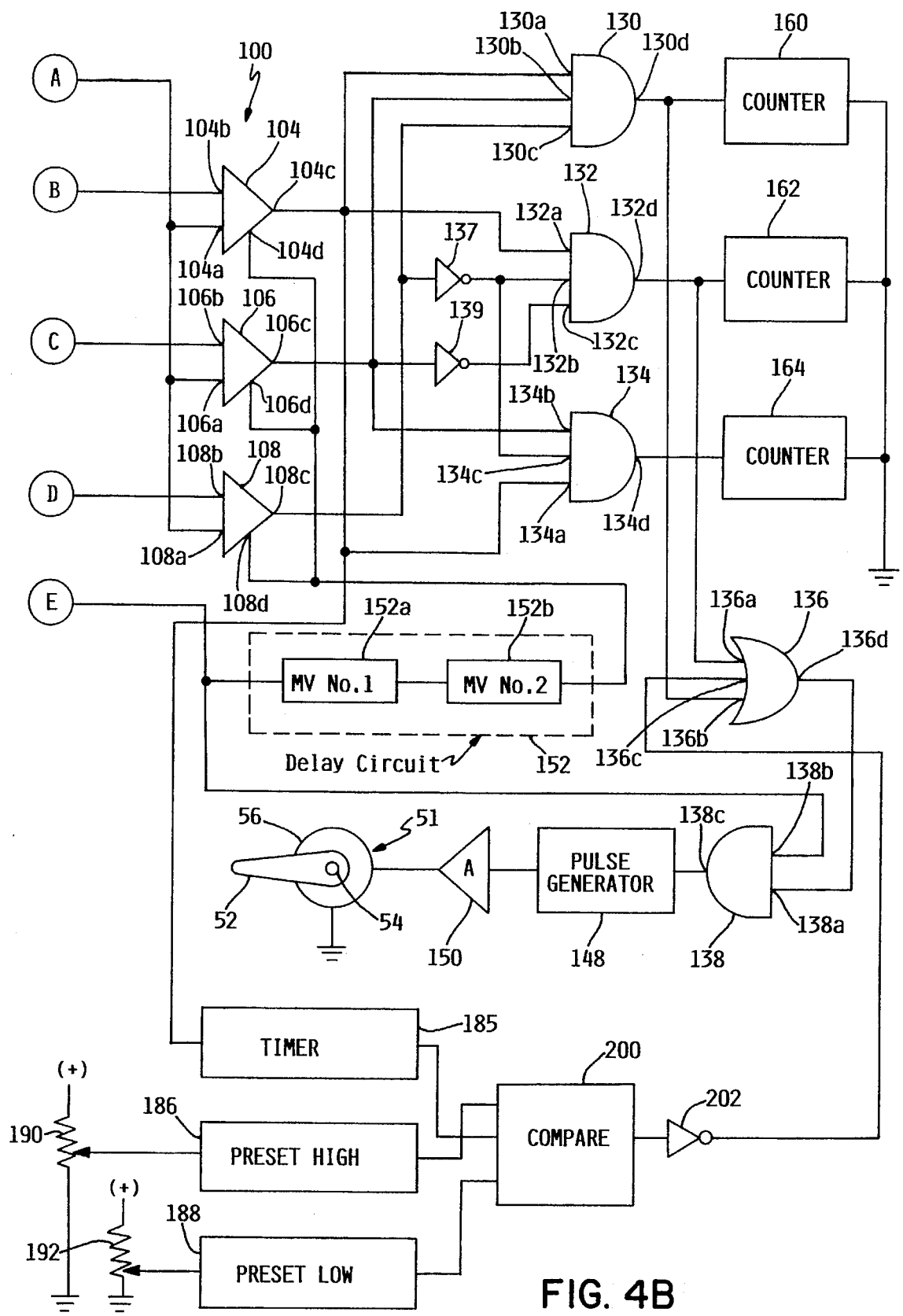

FIG. 4 shows the control circuitry 100 used in conjunction with the invention and includes symbolic representations of some of the invention components. Capacitive transducer 42 includes an electrically grounded plate 46 and a conductive plate 44 connected to transformer 66 secondary windings 170 and 172 via diodes 176 and 178 respectively. The primary winding 171 of transformer 66 is connected to a sine wave oscillator 62 of conventional design, which produces a constant frequency, constant amplitude output under variable load conditions. A regulated DC power supply 64 provides power to the oscillator 62 and to the other components of control circuitry 100.

The oscillator 62 and transformer 66 apply sine wave signals of constant amplitude, frequency and phase to transducer 42, charging plate 44 through diode 176 as the voltage increases in a positive direction during which time the diode 178 is reverse biased. When the voltage changes polarity the plate 44 is discharged through diode 178. Therefore, the transducer 42 is charged and discharged once each cycle, the alternating current variations being rectified by the diodes 176 and 178 into a pulsating direct current. This current is substantially proportional to the capacitance of transducer 42 and reflects any variations in capacitance caused by the passage of the capsules 14 therethrough. The signal is applied as the input to amplifier 180 where it is amplified and transmitted to three different areas of control circuitry 100 as will be hereinafter described.

Control circuitry 100 includes three latchable comparator circuits 104, 106 and 108. Circuit 104 can be considered to be a "presence" circuit, circuit 106 can be considered a "low" circuit, and circuit 108 can be considered a "high" circuit, all with reference to the amplitude detection illustrated in FIG. 3. Each comparator 104, 106 and 108 is inhibited or latched under the control of an external signal or command in a manner hereinafter described, and each is individually set so that the incoming analog signal from amplifier 180, respectively applied to input terminals 104a, 106a, and 108a, will produce an output signal at respective output terminals 104c, 106c and 108c when the input analog signal exceeds the preset latching set point. potentiometer 118 is adjusted to produce the set point for comparator 104 and is connected to input 104b; potentiometer 120 is adjusted to produce the set point for comparator 106 and is connected to input 106b; potentiometer 122 is adjusted to produce the set point for comparator 108 and is connected to input 108b. Potentiometers 118, 120 and 122 are connected to power supply 64.

Potentiometer 118 is adjusted to provide a very low set point voltage corresponding to the trigger voltage level 78 illustrated in FIG. 3. Consequently, when the transducer signal (as amplified by amplifier 180) rises above the trigger voltage level 78, comparator 104 produces a latched output signal at output terminal 104c which persists until a clearing signal is received from delay circuit 152 via reset input 104d.

Potentiometer 120 is adjusted to provide a set point voltage level corresponding to the low limit voltage line 77 shown in FIG. 3. Consequently, when the transducer signal (as amplified by amplifier 180) rises above the low limit voltage level 77, comparator 106 produces a latched output signal at output terminal 106c which persists until a clearing signal is received from delay circuit 152 via reset input 106d.

Potentiometer 122 is adjusted to provide a set point voltage level corresponding to the high limit voltage line 76 shown in FIG. 3. Consequently, when the transducer signal (as amplified by amplifier 180) rises above the high limit voltage level 76, comparator 108 produces a latched output signal at output terminal 108c which persists until a clearing signal is received from delay circuit 152 via reset input 108d.

It will be appreciated that the respective set points selected for comparators 104, 106 and 108 are determined by the weight criteria for the particular type of capsules are to be checked by the apparatus; these potentiometers may be reset for each new type of capsule which is checked.

The output terminal 104c from comparator 104 is connected to an input terminal 130a, an input terminal 132a, and an input terminal 134a of the respective AND logic circuits 130, 132 and 134. The output terminal 106c from comparator 106 is connected to an input terminal 130b of AND logic circuit 130 and to an input terminal 132b of AND logic circuit 132 via an inverter circuit 139 and to an input terminal 134b of AND logic circuit 134. The output terminal 108c from comparator 108 is connected to an input terminal 130c of AND logic circuit 130 and to an input terminal 132c of AND logic circuit 132 via an inverter circuit 137 and to an input terminal 134c of AND logic circuit 134. The inverter circuits 137 and 139 each function to invert the logical sense of their respective received signals. Each of the AND logic circuits 130, 132 and 134 produce an output signal on their respective output terminals 130d, 132d and 134d when signals are received on all three input terminals. Therefore AND logic circuit 130 produces an output signal when signals are sent by all the comparators 104, 106 and 108; AND logic circuit 132 produces an output signal when a signal is sent by comparator 104 and no signals are sent by comparators 106 and 108; AND logic circuit 134 produces an output signal when signals are sent by comparators 104 and 106 and no signal is sent by comparator 108.

An output from AND logic circuit 130 indicates that a capsule should be rejected, because the capsule waveform exceeded the trigger voltage level 78 and exceeded the low limit voltage level 77 and exceeded the high limit voltage level 76. An output signal from AND logic circuit 132 indicates that the capsule should be rejected because the capsule waveform exceeded the trigger voltage level 78 and did not exceed the low limit voltage level 77 and did not exceed the high limit voltage level 76. An output signal from AND logic circuit 134 indicates that the capsule should be accepted, because the capsule waveform exceeded the trigger voltage level 78 and exceeded the low limit voltage level 77 and did not exceed the high limit voltage level 76.

Each of the AND logic circuit outputs are respectively connected to a counter 160, 162 and 164, so that a count may be made of the respective events which each of the logic circuits record. The outputs from AND logic circuits 130 and 132 are also connected to input terminals 136a and 136b, respectively, of OR logic circuit 136. OR logic circuit 136 produces an output signal at its output terminal 136d whenever any one or more input signals are present. An output signal from OR logic circuit 136 provides an indication that a capsule should be rejected.

Referring back to comparator 104, a second function of its output signal is to control the activation of timer circuit 185, which is used to measure the time the capsule waveform signal exceeds the trigger voltage level 78, as shown in FIG. 3. The output signal from comparator 104 is present from the time the capsule waveform signal first crosses the trigger level 78 until the time the capsule waveform signal next crosses the trigger level 78; this time is representative of the velocity of the capsule through the transducer 42. A preset "high" time may be set into counter 186 by potentiometer 190 or other equivalent presetting means, and a preset "low" time may be set into counter 187 by potentiometer 192 or other equivalent presetting means, wherein the two values are representative of the high and low limits of acceptable velocity. The preset values in counters 186 and 188 are connected to a comparison circuit 200, and the value accumulated in timer circuit 185 is also connected to comparison circuit 200. Comparison circuit 200 provides a comparison of the timer value with both the high and low preset values to determine whether the timer value falls between the high and low values; and if it does, comparison circuit 200 provides an output signal to inverter 202. Inverter circuit 202 is connected to input 136c of OR logic circuit 136 to provide a third signal indicative of whether or not a capsule should be rejected; a signal output from inverter circuit 202 indicates that the timer circuit value falls outside the high and low limits; and therefore, the capsule velocity is not acceptable. It should be noted that the functions performed by the circuits herein described as providing the velocity measurement and comparison can equally well be accomplished by a properly programmed computer processor or other equivalent device.

An alternative form of velocity detection is also shown in FIG. 2 utilizing optical transducers which operate independently of the capacitance transducer. In this case an optical transducer 90 may be positioned adjacent the path of travel of the capsule stream wherein transducer 90 has a field of view through the path of travel. A second optical transducer 92 is positioned downstream from the first transducer again having a field of view through the path of travel. As each capsule traverses the path of travel, it breaks the field of view of the first optical transducer 90 at a first time instant and breaks the field of view of the second optical transducer 92 at a second time instant. The two optical transducers respectively develop signals indicative of these time instants, and these signals can be coupled to a time measuring device to record the time of travel between the two transducers. The time of travel can then be used to compare against the preset high and low values to develop a capsule rejection signal if the comparison shows the measured time to be outside the high and low preset values.

Referring back to amplifier 180, another function provided by the output signal from amplifier 180 is to control the actuation and timing of the capsule rejection mechanism. An output from amplifier 180 is connected to input terminal 140a of comparator 140 and is compared with a reference input signal at input terminal 140b which is derived from potentiometer 142. When the amplifier 180 output signal exceeds the reference input signal, an output signal is produced at output 140c which is connected to multiplier 144.

Multiplier 144 functions as a pulse stretcher to extend the pulse width of the input signal. Multiplier 144 is connected to a trigger circuit 146 which produces a trigger signal at the end of the stretched pulse from multiplier 144. Trigger circuit 146 is connected to a delay circuit 152 comprising two multivibrator circuits 152a and 152b connected in series and is also connected to input terminal 138b of AND logic circuit 138. The two multivibrators 152a and 152b generate a delayed "clear" signal which is connected back to reset comparator latches 104, 106 and 108, and thereby return them to an operative state for the next capsule which passes through transducer 42.

The signal at input terminal 138b is ANDed with the signal at input terminal 138a to produce an output signal at output terminal 138c when both signals are present. The output signal from output terminal 138c is connected to a pulse generator 148 which produces a pulse signal connected to reject mechanism 51 via amplifier 150. The pulse signal is applied to motor 56 to actuate the motor and thereby cause the flipper arm 52 to deflect. The timing of the deflection of the flipper arm 52 is empirically determined to coincide with the position of the capsule as it leaves the transducer to deflect the capsule's path of travel to a reject container 60.

In operation, a supply of capsules is provided to the inlet of chute 22, the capsules being in end-to-end contact at the inlet of the air jet device 24. Air jet device 24 provides a series of spaced-apart air jets to sequentially accelerate capsules through tube 40 and transducer 42. As each capsule passes through transducer 42, the measurements described hereinbefore are made and a decision is made concerning whether the capsule should be rejected before the capsule reaches the reject mechanism 51. If the capsule is to be rejected, the flipper arm 52 is actuated at a time coinciding with the arrival of the capsule at the reject mechanism 51, thereby deflecting the capsule's path of travel upwardly to curved deflector 58 and thereafter to container 60. If the capsule is not to be rejected, the flipper arm is not actuated thereby permitting the capsule path of travel to continue substantially horizontally to curved deflector 48 and thereafter to container 50.

Although the embodiment described herein is one preferred embodiment for practicing the invention, it is to be understood that other preferred embodiments are also suitable for this purpose. For example, the logical circuits described herein, and the various circuits for processing the data received for the transducer, can equally well be implemented by a programmed computer processor. It is well within the skill of the computer art to prepare a software program which accomplishes the objects and purposes of the invention according to the teachings herein.

What is claimed is:

1. An apparatus for detecting each capsule in a moving stream of capsules along a predetermined path of travel and for measuring the weight of each capsule and for measuring the velocity of each capsule, comprising:
   a) a capacitance sensor positioned adjacent said path of travel having means for developing an electrical signal representative of the capacitance of each capsule as it moves past said capacitance sensor;
   b) a velocity sensor positioned adjacent said path of travel having means for developing an electrical signal representative of the velocity of each capsule as it moves past said velocity sensor;
   c) means for developing preset values representative of an acceptable range of capacitance values for said capsules;
   d) means for developing preset values representative of an acceptable range of velocity values for said capsules;
   e) means for comparing said electrical signal representative of the capacitance of each capsule with said preset values representative of an acceptable range of capacitance values, and for developing a first reject signal when said electrical signal is outside said acceptable range;
   f) means for comparing said electrical signal representative of the velocity of each capsule with said preset values representative of an acceptable range of velocity values and for developing a second reject signal when said electrical signal is outside said acceptable range; and
   g) a movable flipper arm positioned adjacent said path of travel and having an actuable position interposed into said path of travel and means for actuating said flipper arm by the combined first and second reject signals.

2. The apparatus of claim 1, wherein said velocity sensor further comprises first and second optical sensors respectively positioned in spaced-apart relationship along said path of travel.

3. The apparatus of claim 1, wherein said velocity sensor further comprises a trigger circuit connected to said capacitance sensor, said trigger circuit having means for developing a first trigger signal when said capacitance sensor signal exceeds a first predetermined value and means for developing a second trigger signal when said capacitance sensor signal becomes less than said first predetermined value, subsequent to said first trigger signal; and means for developing a velocity signal from said first and second trigger signals.

4. An apparatus for detecting each capsule in a moving stream of capsules and for measuring the weight of the capsule by capacitance sensing and by velocity measurement, comprising:
   a) an elongate tube for conveying said capsules, and a capacitance sensor fixedly mounted about said tube;
   b) an air jet device connected to said tube for uniformly accelerating each of said capsules through said tube and past said capacitance sensor;
   c) an electrical sensor circuit connected to said capacitance sensor, said sensor circuit developing an electrical sensor signal for each capsule passing through said sensor, said sensor signal having an amplitude representative of the measured capacitance of said capsule and a time duration representative of the velocity of said capsule;
   d) means for manually entering and storing signals representative of a maximum and minimum amplitude value, and means for manually entering and storing signals representative of a maximum and minimum time value;
   e) first comparison means connected to said sensor circuit and to said means for manually entering and storing signals representative of a maximum and minimum amplitude value for comparing said sensor signal amplitude with said maximum and minimum amplitude values and for developing a first reject signal if said amplitude is outside the range defined by said maximum and minimum amplitude values;
   f) second comparison means connected to said sensor circuit and to said means for manually entering and storing signals representative of a maximum and minimum time value for comparing said sensor signal time duration with said maximum and minimum time values and for developing a second reject signal if said time duration is outside the range defined by said maximum and minimum time values;
   g) a mechanical reject arm positioned downstream of said capacitance sensor and adjacent the path of said stream of capsules, said arm having an actuable position interposed into said capsule stream, thereby deflecting capsules into a secondary stream; and
   h) means for actuating said reject arm connected to said first and second comparison means and operable by the presence of either said first or second reject signal.

5. The apparatus of claim 4, further comprising a trigger circuit connected to said sensor circuit, said trigger circuit developing a first trigger signal when the amplitude of said sensor signal exceeds a first predetermined value and developing a second trigger signal when the amplitude of said sensor signal thereafter becomes less than a second predetermined value; and wherein said second comparison means for comparing further comprises means for comparing the time duration between said first and second trigger signals with said maximum and minimum time values.

6. The apparatus of claim 5, wherein said first and second predetermined values are equal.

7. The apparatus of claim 4, further comprising first counter means connected to said electrical sensor circuit, for accumulating a count of the number of capsules detected by said sensor circuit.

8. The apparatus of claim 7, further comprising second counter means connected to said means for actuating said reject arm for accumulating a count of the number of times said reject arm is actuated.

* * * * *